United States Patent
Chang et al.

(10) Patent No.: US 6,313,790 B2
(45) Date of Patent: Nov. 6, 2001

(54) METHOD AND SYSTEM FOR DETERMINING A POSITION OF A TRANSCEIVER IN A COMMUNICATIONS NETWORK

(75) Inventors: Donald C. D. Chang, Thousand Oaks; Kar W. Yung, Torrance; William J. Nunan, Manhattan Beach; David C. Cheng, Palos Verdes Estates; Bruce E. Shuman, Playa Del Rey, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/780,103

(22) Filed: Feb. 9, 2001

Related U.S. Application Data

(63) Continuation of application No. 09/174,182, filed on Oct. 16, 1998, now Pat. No. 6,229,477.

(51) Int. Cl.$^7$ .................. H04B 7/185; G01S 5/02
(52) U.S. Cl. ................ 342/357.16; 342/357.01; 342/353
(58) Field of Search ............ 342/357.16, 357.01, 342/352, 353

(56) References Cited

U.S. PATENT DOCUMENTS

| 2,470,787 | 5/1949 | Nosker .................................. 342/12 |
| 3,384,891 | 5/1968 | Anderson ............................. 342/357 |
| 3,544,995 | 12/1970 | Bottenberg et al. .................. 342/46 |

(List continued on next page.)

FOREIGN PATENT DOCUMENTS

| 0 335 558 | 4/1989 | (EP) . |
| 2 271 902 A | 4/1994 | (GB) . |
| 2 306 827 A | 5/1997 | (GB) . |

(List continued on next page.)

OTHER PUBLICATIONS

Teles J et al.: "Overview of TDRSS" Orbit Determination and Analysis. PSD Meeting, Cospar Technical Panel on Satellite Dynamics, 13$^{th}$ Cospar Scientific Assembly, Hamburg, Germany, Jul. 11–21, 1994, Advances in Space Research, pp. 67–76.

(List continued on next page.)

*Primary Examiner*—Theodore M. Blum
(74) *Attorney, Agent, or Firm*—Vijayalakshmi D. Duraiswamy; Michael W. Sales

(57) ABSTRACT

A method and system for determining a position of an orbiting transceiver in a communications network includes at least a first and second transceiver at a first and second known location, respectively, on Earth. The first and second transceivers are adapted to transmit and receive communications signals to and from the orbiting transceiver. A processor coupled to one of the first and second transceivers determines a first and second range measurement between each of the first and second transceivers and the orbiting transceiver, respectively, as well as corresponding first and second range rates representative of a time rate of change of the first and second range measurements. The processor then determines a circle of intersection representative of the set of possible positions for the orbiting transceiver based on the first range measurement and the first range rate wherein the circle of intersection includes a specific orientation in space, a specific radius and a center in a specific, three-dimensional position relative to the known position of the first transceiver. An angular position of the orbiting transceiver is then determined along the circle of intersection based on the known position of the second transceiver and the second range measurement. Finally, the position of the orbiting transceiver is determined based on the circle of intersection and the angular position.

8 Claims, 3 Drawing Sheets

U.S. PATENT DOCUMENTS

| | | | |
|---|---|---|---|
| 4,161,730 | 7/1979 | Anderson | 342/352 |
| 4,161,734 | 7/1979 | Anderson | 342/352 |
| 4,359,733 | 11/1982 | O'Neill | 343/6.5 |
| 4,613,864 | 9/1986 | Hofgen | 343/357 |
| 4,897,661 | 1/1990 | Hiraiwa | 342/457 |
| 4,994,809 | 2/1991 | Yung et al. | 342/108 |
| 5,006,855 | 4/1991 | Braff | 342/357 |
| 5,099,245 | 3/1992 | Sagey | 342/357 |
| 5,111,209 | 5/1992 | Toriyama | 342/357 |
| 5,126,748 | 6/1992 | Ames et al. | 342/353 |
| 5,387,916 | 2/1995 | Cohn | 342/44 |
| 5,410,314 | 4/1995 | Frush et al. | 342/26 |
| 5,444,450 | 8/1995 | Olds et al. | 342/357 |
| 5,525,995 | 6/1996 | Benner | 342/90 |
| 5,739,785 | 4/1998 | Allison et al. | 342/357 |
| 5,920,284 | 7/1999 | Victor | 342/357.01 |
| 5,944,770 | 8/1999 | Enge et al. | 701/707 |
| 5,945,948 | 8/1999 | Buford et al. | 342/457 |
| 5,969,674 | 10/1999 | Von der Embse et al. | 342/357.17 |

FOREIGN PATENT DOCUMENTS

| | | |
|---|---|---|
| 2-28580 | 1/1990 | (JP) . |
| 3-291584 | 12/1991 | (JP) . |
| 4-27887 | 1/1992 | (JP) . |
| 07146995A | 6/1995 | (JP) . |
| 08015405A | 1/1996 | (JP) . |
| 09026328 | 1/1997 | (JP) . |
| 09113600A | 5/1997 | (JP) . |
| 10090391A | 4/1998 | (JP) . |

OTHER PUBLICATIONS

Bricker, P et al.: "Integrated Receiver for NASA Tracking and Data Relay Satellite System"; MILCOM 90. A new Era, 1990 IEEE Military Communications Conference, Monterey, CA, USA, Sep. 30–Oct. 3, 1990, pp. 1–5.

Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp. 292–301.

K. H. Bethke, "A Novel Noncooperative Near–Range Radar Network or Traffic Guidance and Control on Airport Surfaces", IEEE Transactions on Control Systems Technology, vol. 1, No. 3, Sep. 1993, pp. 168–178.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

U.S. application Ser. No. 09/209,062, Yung et al., filed Dec. 9, 1988, (PD–970590) Method and System for Incorporating Two–Way Ranging Navigation as a Calibration Reference for GPS.

U.S. application Ser. No. 08/803,935, Chang et al., filed Feb. 21, 1997, (PD–960367) Method and System for Determining a Position of a Transceiver Unit Utilizing Two–Way Ranging in a Polystatic Satellite Configuration Including a Ground Radar.

U.S. application Ser. No. 09/746,997, Chang et al., filed Dec. 22, 2000, (PD–960367A) Method and System for Determining a Position of a Transceiver Unit Utilizing Two–Way Ranging in a Polystatic Satellite Configuration Including a Ground Radar.

U.S. application Ser. No. 08/803,937, Chang et al., filed Feb. 21, 1997, (PD–96330) Method and System for Determining a Position of a Transceiver Unit Utilizing Two–Way Ranging in a Polystatic Satellite Configuration.

METHOD AND SYSTEM FOR DETERMINING A POSITION OF A TRANSCEIVER IN A COMMUNICATIONS NETWORK

CROSS-REFERENCE TO RELATED APPLICATIONS

This is a continuation of application Ser. No. 09/174,182 filed Oct. 16, 1998, now U.S. Pat. No. 6,229,477.

This application is related to U.S patent application Ser. No. 08/803,935, filed Feb. 21, 1997, entitled "Method And System For Determining A Position Of A Transceiver Unit Utilizing Two-Way Ranging in a Polystatic Satellite Configuration", now abandoned.

TECHNICAL FIELD

This invention relates to methods and systems for determining a position of a communication satellite utilizing two-way ranging through multiple transceivers.

BACKGROUND ART

Current Automatic Dependent Surveillance (ADS) technology, such as Global Positioning System (GPS), Wide Area Augmentation System (WAAS) or GLONASS, provides positioning information utilizing satellite transmissions. For example, the GPS, developed and deployed by the U.S. Department of Defense, consists of 24 satellites orbiting the earth twice a day at an altitude of 12,000 miles, as well as five ground stations to monitor and manage the satellite constellation. Using atomic clocks and location data, GPS satellites transmit continuous time and position information 24 hours a day to a GPS receiver, which listens to four or more satellites at once to determine a user's position. By measuring the time interval between the transmission and the reception of a satellite signal, the GPS receiver calculates the distance between the user and each satellite, and then uses the distance measurements of at least four satellites to arrive at a position.

Such systems, however, utilize one-way ranging in which an accurate, synchronized clock is required at each station. Any synchronization error or error regarding the location of one of the satellites results in an error in the determined position of the target vehicle.

Any type of satellite based navigation system must determine the position and velocity of its ranging satellites to extremely high accuracy. Position and velocity determination are vital parts of the station-keeping function for any satellite, even one which is not part of a navigation system.

One known system requires the satellite to have simultaneous contact with all of its ground stations in order to obtain position information. This, however, may not always be possible for a satellite in a non-geostationary orbit which moves relative to the Earth and, therefore, periodically loses access to any given point on the Earth's surface.

DISCLOSURE OF THE INVENTION

It is thus a general object of the present invention to provide a method and system for determining the position of a communication satellite utilizing two-way ranging.

In carrying out the above object and other objects, features, and advantages of the present invention, a method is provided for determining a position of an orbiting transceiver in a communications network including at least a first and second transceiver at a first and second known location, respectively, on Earth. The first and second transceivers are adapted to transmit and receive communications signals to and from the orbiting transceiver. The,method includes determining a first and second range measurement between each of the first and second transceivers and the orbiting transceiver, respectively. The method further includes determining a first and second range rate corresponding to a time rate of change of the first and second range measurements, respectively. The method also includes determining a circle of intersection representative of the set of possible positions for the orbiting transceiver based on the first range and the first range rate wherein the circle of intersection includes a specific orientation in space, a specific radius and a center in a specific, three dimensional position relative to the known position of the first transceiver. Still further, the method includes determining an angular position of the orbiting transceiver along the circle of intersection based on the known position of the second transceiver and the second range measurement. Finally, the method includes determining the position of the orbiting transceiver based on the circle of intersection and the angular position.

In further carrying out the above object and other objects, features, and advantages of the present invention, a system is also provided for carrying out the steps of the above described method. The system includes at least a first and second transceiver at a first and second known location, respectively, on Earth. The first and second transceivers are adapted to transmit and receive communications signals to and from the orbiting transceiver. A processor coupled to one of the first and second transceivers is operative to determine a first and second range measurement between each of the first and second transceivers and the orbiting transceiver, respectively. The processor is further operative to determine a first and second range rate corresponding to a time rate of change of the first and second range measurements, respectively. Still further, the processor is operative to determine a circle of intersection representative of the set of possible positions for the orbiting transceiver based on the first range measurement and the first range rate wherein the circle of intersection includes a specific orientation in space, a specific radius, and a center in a specific, three-dimensional position relative to the known position of the first transceiver. The processor further determines an angular position of the orbiting transceiver along the circle of intersection based on the known position of the second transceiver and the second range measurement. Finally, the processor determines the position of the orbiting transceiver based on the circle of intersection and the angular position.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
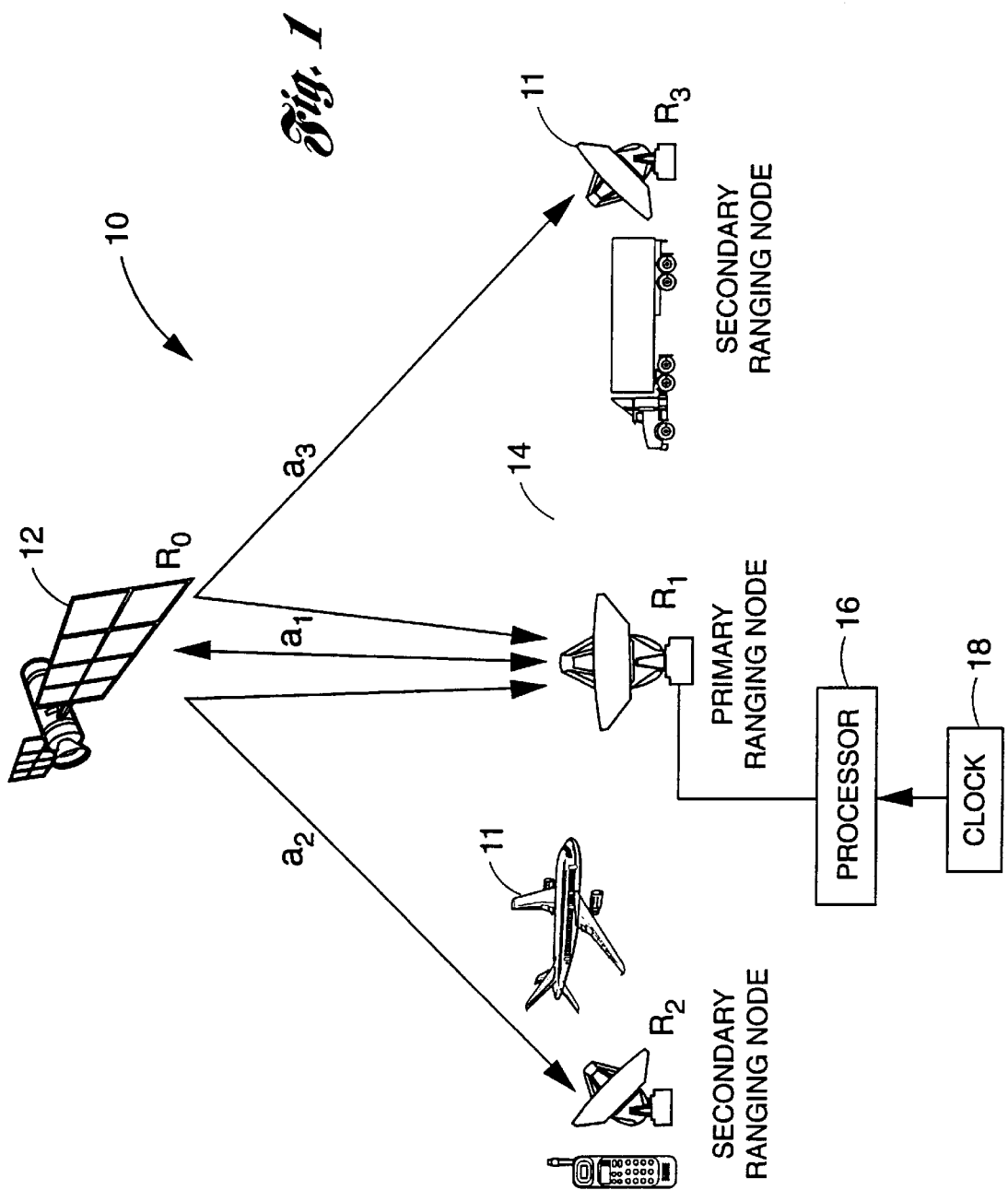
FIG. 1 is a diagram illustrating a communication system employing the method and system of the present invention.

FIG. 1 diagrammatically illustrates a communication system with a typical geometry for practicing the present invention. This system, denoted generally by reference numeral 10, includes a target communication satellite 12 whose position (denoted $R_0$) is to be determined. The system 10 in FIG. 1 also includes a primary ranging node (RN) 14—such as a satellite ground station—at the position denoted $R_1$, as well as secondary ranging nodes 11 at positions $R_2$ and $R_3$. There may be many other secondary RNs at positions $R_4$, $R_5$, etc. These additional RNs are not shown in FIG. 1; however, their modes of operation are identical to those described for the RNs at $R_2$ and $R_3$. A secondary RN may be any device that includes a transceiver such as, for example, automobiles, mobile telephones, aircraft, or the like, as long as they are stationary during operation of the present invention. As shown in FIG. 1, the distances between the satellite 12 at $R_0$ and all the RNs at $R_1$, $R_2$, $R_3$, etc. are denoted $a_i=|R_i-R_0|$, where i>0.

For example, a parked commercial airliner can act as a secondary RN. When a commercial airliner is parked at an airport gate, its pilot enters the precise position of the aircraft into the onboard navigation system. This information allows the inertial navigation system to correct for drift and accumulated position error. As long as the aircraft is parked at the gate, its position is known to a high degree of accuracy. If it is equipped with an appropriate transceiver, then it can act as a secondary RN at position $R_2$ or $R_3$. If a large number of aircraft are thus equipped, and a significant percentage of them are parked at a gate at any given time, then the satellite 12 at $R_0$ can use these parked aircraft at $R_2$ and $R_3$ as RNs.

The RNs at $R_1$, $R_2$, $R_3$, etc. communicate with each other by relaying messages through the satellite 12 at position $R_0$. In the course of operation of the present invention, the primary RN 14 receives two distinct kinds of signals: ranging codes broadcast by the satellite 12, and reply codes which also are relayed through the satellite 12, but originate at secondary RNs 11. A processor 16 located at the primary RN 14 at $R_1$ distinguishes the two types of signals, and makes the computations required for the determination of the position of the satellite 12.

The position of the satellite 12 is determined according to the following sequence of steps. First, at a precisely measured time, and on a precisely measured carrier frequency, the primary RN 14 at $R_1$ transmits a ranging signal to the satellite 12 at $R_0$, which broadcasts it to all of the RNs, including the primary RN 14 at $R_1$, and secondary RNs 11 at $R_2$, $R_3$, etc. The secondary RNs 11 then transmit their distinctive reply code signals back to the satellite 12 for transmission back to primary RN 14. Immediately upon receiving the ranging and reply code signals, the processor 16 at the primary ranging node 14 ($R_1$) measures the carrier frequency and arrival time of the ranging signal. It then computes the difference between the ranging code's arrival time and the time of its original transmission from the primary ranging node 14. This time difference is a propagation time, denoted $t_{p1}$, and is associated with the distance of the transmission of ranging signals from the primary RN 14 at $R_1$, to the satellite 12 at $R_0$, and back to $R_1$. This distance, denoted $D_1$, is equal to $2a_1$. The processor 16 also measures the difference in carrier frequency between the received reply code signal and that of the originally transmitted ranging code. From that frequency difference the processor computes the Doppler frequency shift, as described below.

Before continuing with the description of the processor's computations, we describe the measurements made on signals passing through the secondary RNs 11. As mentioned above, immediately upon receiving a ranging code, the secondary RNs 11 at positions $R_2$, $R_3$, $R_4$, etc. each transmit a reply ranging signal to the primary RN 14 at $R_1$ via the satellite 12 at $R_0$. These reply signals are designed such that they uniquely identify the particular ranging code to which they are replying, and the secondary RN 11 from which they are transmitted. The processor 16 at $R_1$ can then determine the position $R_i$ of the secondary RN 11 which initiated the particular reply code, where $R_i$ is an element of the set of all known secondary RN positions $\{R_2, R_3, \ldots\}$. The processor 16 also measures the arrival time of each reply signal, and computes the difference between that time and the time of original transmission from the primary ranging node 14 of the ranging code which elicited the is reply signal. That difference is denoted as a propagation time, $t_{pi}$. Thus, the measured times for round trip communication with secondary RNs at $R_2$, $R_3$, etc. are denoted $t_{p2}$, $t_{p3}$, etc. respectively.

Referring again to FIG. 1, we see that the paths associated with propagation times $t_{pi}$ for i>1 are of a different shape than the path associated with $t_{p1}$ and $D_1$. For i>1, $D_i$ is the path length from the primary ranging node 14 at $R_1$, to the satellite 12 at $R_0$, to the secondary ranging node 11 at $R_i$, then back to satellite 12 at $R_0$, and finally, back to primary ranging node 14 at $R_1$. To a first approximation, $D_i = 2(a_i + a_1)$ for i>1. This equality is only approximate because it neglects the fact that the satellite 12 moves during the time of the signal's trip from $R_0$ to $R_i$ and back to $R_0$. In reality, the satellite 12 will be in a different place when relaying the initial ranging signal from $R_1$ to $R_i$ than when relaying the reply signal from $R_i$ back to $R_1$. We can correct for this effect, but in the interest of clarity, we neglect it in the present description of the system, but not in the final implementation.

We now outline a computational procedure which transforms a set of frequency shifts and propagation time measurements first into a set of communication path lengths ($D_1$, $D_2$, $D_3$, etc.), then into a set of ranges ($a_1$, $a_2$, $a_3$, etc.), and finally, into a three dimensional, vector position of the satellite 12. The measurements of propagation time include time for an electromagnetic wave to travel the prescribed path, and also delay times associated with the electronic detection and retransmission of messages. These intervals are all measured with a single clock 18 at $R_1$; therefore, secondary RNs at $R_2$, $R_3$, etc. do not need clocks, and the system depicted in FIG. 1 does not have any clock bias errors such as those in The Global Positioning System (GPS).

Signal Delay Times and Distances

For the path corresponding to each measured propagation time $t_{p1}$, $t_{p2}$, $t_{p3}$, etc., the processor 16 at $R_1$ computes an estimate of the total time delay, $t_{di}$, for all transceivers as well as tropospheric and ionospheric propagation along that path. The corresponding delay times $t_{d1}$, $t_{d2}$, $t_{d3}$, etc. are then used in the computation of the corresponding distances between the transceivers.

The ionosphere and atmosphere are two elements in the signal path that slow the signal to less than the vacuum speed of light, which is defined as c=299,792,458 meters/second. The delay time, $t_{di}$, is defined as the propagation time of a signal over the $i^{th}$ path minus the time required for an electromagnetic wave to traverse a path of the same length in a perfect vacuum. Given that $D_i$ is the length of the $i^{th}$ communication path, $D_i = c(t_{pi} - t_{di})$. Delay time is the sum of many components, due to the ionosphere, atmosphere, transmitter, receiver, etc., and is never negative.

The atmospheric and ionospheric signal delays have been thoroughly studied, and mathematical models have been constructed which can predict these components of delay time (for example: Black, H. D., "An Easily Implemented Algorithm for the Tropospheric Range Correction," JOURNAL OF GEOPHYSICAL RESEARCH, vol. 83, no. B4, p. 1825, (1978); and for the ionospheric effect: Klobuchar, J. A., "Design and Characteristics of the GPS Ionospheric Time Delay Algorithm for Single Frequency Users," IEEE PLANS '86: Position Location and Navigation Symposium, Las Vegas, Nev., Nov. 4, 1986, p. 280).

The ionospheric delay is harder to predict with high accuracy than that of the troposphere because the ionosphere undergoes more radical variations over time. If a particular application demands the highest possible accuracy, then the system 10 will rely upon additional measurements rather than a fixed mathematical model in order to determine the ionospheric propagation delay. Because that delay is inversely proportional to the square of the radio carrier frequency, and because it varies with location and time, additional measurements of round-trip signal propagation time through different ground reference points and/or at different carrier frequencies will provide the continuous measurements of the ionosphere which are needed for the highest accuracy range measurements. The availability of a large number of secondary RNs provides extra information which can be used to determine the characteristics of the ionosphere, the troposphere, and other sources of signal delay in the communication path. The present invention can compensate for the time varying tropospheric and ionospheric signal propagation delays more accurately than a system which contains a very small number of RNs or turn-around ranging stations.

Other sources of delay involving the system's antennas, transmitters, and receivers (including multi-path, etc.) are similarly estimated. All of the estimated time delays associated with the ith communication path are estimated, and added together to produce the total estimated time delay, $t_{di}$. All such delay times $t_{d1}$, $t_{d2}$, $t_{d3}$, etc. are then used in the computation of the corresponding communication path lengths $D_1$, $D_2$, $D_3$, etc., via the formula $D_i = c(t_{pi} - t_{di})$ Based on $D_1$, $D_2$, $D_3$, etc., the system 10 computes the ranges $a_1$, $a_2$, $a_3$, etc., via formulas such as: $a_1 = D_1/2$, and $a_i = (D_i - D_1)/2$. As mentioned previously, the final implementation involves more complicated equations than these, due to the motion of the satellite 12 during the time interval between its broadcast of the ranging signal and its relay of the reply signal. The correction is omitted here to simplify the presentation. The processor 16 then uses those ranges and the known positions of the RNs 14, 11, ($a_i$ and $R_i$ for i>0) to compute the satellite's position $R_0$ by means of one of the two procedures described below.

We derive two algorithms for determination of the (three dimensional) vector position of the satellite 12; a "Three Sphere Algorithm" which uses range measurements involving at least three ground transceivers, and a "Range and Range Rate Algorithm" which uses range measurements from only two ground transceivers. "Range Rate" refers to the time rate of change of range ($da_i/dt$), and is derived from a combination of the time sequence of range measurements and measurements of the Doppler frequency shift of the radio signal, which is described briefly below. The "Range and Range Rate Algorithm" applies only to satellites which are not in geostationary orbit; whereas, the "Three Range Algorithm" applies to geostationary or non-geostationary satellites.

Doppler Frequency Shift

If a transmitter at position $R_1$ sends a radio signal at carrier frequency $f_1$, to a receiver at position $R_0$ which is approaching or receding, then the receiver will detect the signal at a different frequency $f_0$ due to the Doppler effect. The size of the Doppler frequency shift depends on the radial velocity, which we denote as $v_r$, and which equals the time rate of change of the distance between the transmitter and receiver. If the velocity of the receiver relative to the transmitter is much smaller in magnitude than the speed of light, then (approximately), $$f_0/f_1 = 1 - v_r/c.$$

If another signal is transmitted at frequency $f_0$ from $R_0$ back to $R_1$, then the Doppler shift is compounded, so that the frequency detected at $R_1$ is $$f_{11} = f_0(1 - v_r/c) = f_1(1 - v_r/c)^2,$$

which is approximately $$f_{11} = f_1(1 - 2v_r/c).$$

The Doppler frequency shift ($f_d$) is the difference between the frequency $f_{11}$, received at point 1 after the round-trip, and that of the signal initially transmitted from point 1, which is $f_1$; therefore, $$f_d = f_{11} - f_1 = -2f_1 v_r/c.$$

The Doppler shift measurement therefore yields a measurement of the radial velocity, $$v_r = -c f_d/(2f_1),$$

and this information contributes to the orbit determination, as described below.

Geometry

In this invention, we present two algorithms which may be used to convert a set of scalar measurements into the vector position of the satellite 12. The "Three Sphere" positioning algorithm employs round trip signal propagation between a transceiver at an unknown location (which we denote $R_0$) and a set of three or more RNs. The "Range and Range Rate" positioning algorithm requires round trip communication between the transceiver at $R_0$ and only two RNs, but also requires that $R_0$ be moving relative to the RNs. In both of these approaches, the round trip pattern of communication implies that all round trip propagation time intervals can be measured from a single clock located at the primary RN. There is no need for highly accurate or synchronized clocks at any other location in the system.

In contrast, a typical GPS receiver requires measurements of signals from four different transmitters in order to solve for the receiver's position. Due to the one way nature of the communication, the GPS transmitters must have highly accurate and precisely synchronized clocks, and each GPS receiver must solve for the precise local time while determining its three dimensional position.

An additional advantage of the present invention is that these two algorithms are direct, closed form solutions to the nonlinear system of equations which define the satellite's position; whereas, GPS uses an iterative solution to a linearized approximation of an intrinsically non-linear problem. The direct solution is more computationally efficient, faster, and more accurate.

"Three Sphere" Algorithm

The three sphere algorithm transforms the ranges ($a_1$, $a_2$, $a_3$, etc.) computed above and the known positions of three or more RNs ($R_1$, $R_2$, $R_3$, etc.) into the three dimensional, vector position of the satellite 12 relative to the Earth. We use the following notation to aid in the concise expression of the algorithm.

Vector Notation

In all of the following equations, upper case letters denote three component vectors, and lower case letters denote scalar (non-vector) quantities.

A×B=cross product (vector product) of vectors A and B, such that if C=A×B then the three components of C are:

$c_x = a_y b_z - a_z b_y$ $c_y = a_z b_x - a_x b_z$ $c_z = a_x b_y - a_y b_x$

Note that the resulting C is perpendicular to A and to B.

A·B=$a_x b_x + a_y b_y + a_z b_z$=dot product (also known as the scalar product or inner product) of vectors A and B.

$A^2$=A·A=square of the length of vector A which equals the sum of the squares of the three components (x, y, z) of the vector (as per the Pythagorean theorem in three dimensions).

$|A|=(A·A)^{1/2}$=length of vector A.

$R_j$=vector which points from the center of the Earth to the position of the $j^{th}$ RN, where j=[1, 2, 3, . . . ].

$R_0$=vector which points from the center of the Earth to the position of the satellite to be located.

$R_{jk}=R_j-R_k$=vector from point k to point j.

$a_j=|R_{0j}|$=distance measurement from the $j^{th}$ RN to the satellite.

Intersection of Two Spheres

The satellite's position, $R_0$, will be determined relative to the RN positions ($R_1$, $R_2$, . . . ). The following geometrical and mathematical derivation of $R_0$ is performed not directly in Earth centered coordinates, but rather, in a coordinate system defined by the positions of the RNs. This choice of coordinate system separates the vector $R_{01}$ (which points from the known $R_1$ to the unknown $R_0$) into three mutually perpendicular components (denoted $R_{p1}$, $R_{qp}$, $R_{0q}$). In this carefully selected coordinate system, each of these vector components can be computed directly (non-iteratively) from the measurements ($a_1$, $a_2$, $a_3$). The sum of these three vectors and the position is vector of the primary RN ($R_1$) is the desired location of the satellite (R0). Symbolically:

$R_0 = R_{0q} + R_{qp} + R_{P1} + R_1.$

The following discussion describes the geometrical process of locating the intermediate points $R_p$ and $R_q$ in space, and then deriving algebraic formulas for those positions.

Figure 2:
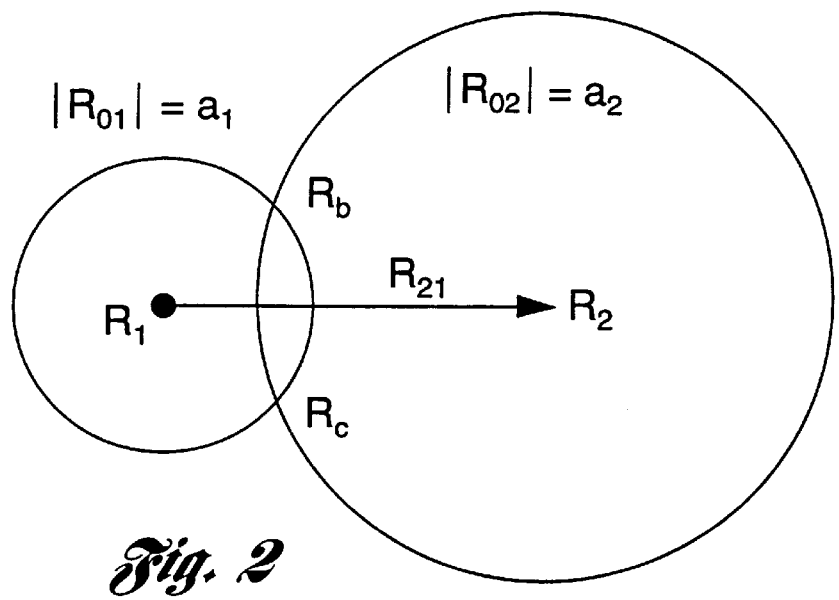
FIG. 2 is a diagram illustrating the geometrical plane containing two ranging nodes of the present invention.

FIG. 2 shows a plane containing the primary RN 14 at $R_1$ and the secondary RN at $R_2$. It also shows the vector $R_{21}=R_2-R_1$, which points from $R_1$ to $R_2$. The measurement a1 limits the possible positions of $R_0$ to the points on a sphere of radius $a_1$ which is centered at $R_1$. The intersection of that sphere with the plane of FIG. 2 is a circle of radius $a_1$. That circle is labeled $|R_{01}|=a_1$. Although $R_0$ might lie on this circle, it is far more likely to lie above or below the plane depicted in FIG. 2.

Similarly, the measurement $a_2$ limits the possible positions of $R_0$ to the points on a sphere of radius $a_2$ which is centered at $R_2$. The intersection of that sphere with the plane of FIG. 2 is the circle labeled $|R_{02}|=a_2$. Since $R_0$ must lie on both of these spheres, the only possible solution points for $R_0$ in the plane of FIG. 2 are the points labeled $R_b$ and $R_c$, where the two circles intersect; however, there are other possible solution points above and below this plane.

In order to visualize the location of all possible points which lie on both of the afore-mentioned spheres, one may slowly flip over the picture in FIG. 2, doing so in a way that does not move vector $R_{21}$. During this slow rotation of the picture, one sees that the circles in the plane trace out spheres in three dimensions, and that $R_b$ and $R_c$ trace out a circle of possible positions for $R_0$. That circle lies in another plane which is perpendicular to the vector $R_{21}$. In other words, the circle defined by the intersection of the two spheres sticks out at a right angle from the plane depicted in FIG. 2.

Figure 3:
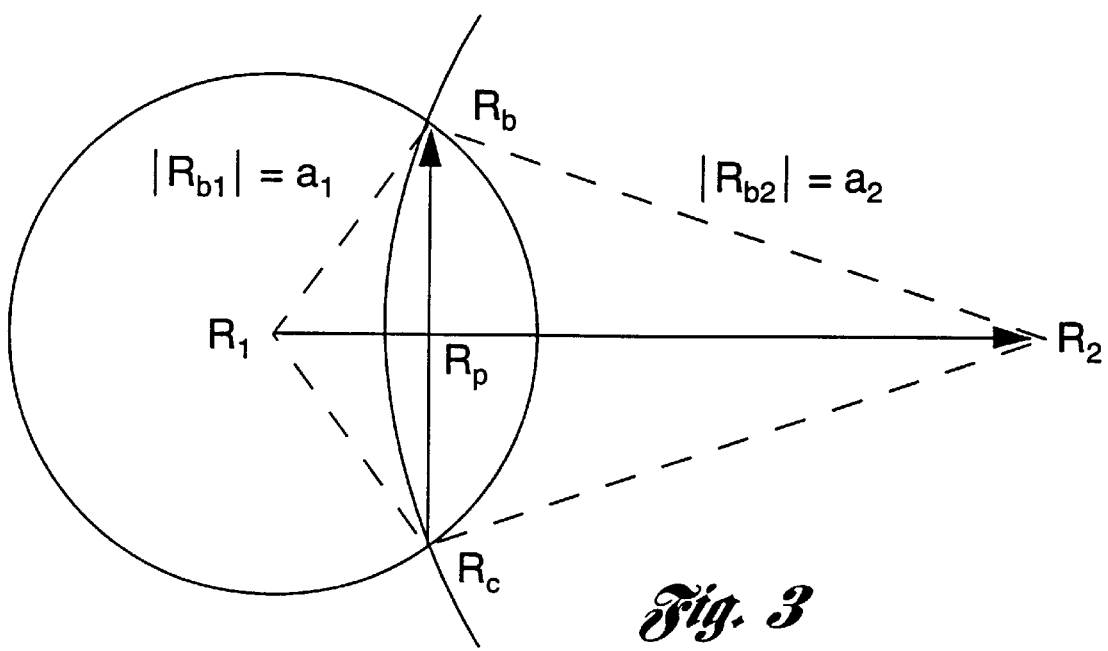
FIG. 3 is a diagram illustrating an enlarged view of the plane of FIG. 2.

Having considered the geometrical construction of the circle of intersection, we now develop equations which quantify the position of the structures discussed above. FIG. 3 is an enlargement of the central region of FIG. 2, with additional details added. The vector from $R_1$ to $R_b$ is denoted $|R_{b1}|=a_1$, where $a_1$ is its length. Similarly, the vector from $R_2$ to $R_b$ is denoted $|R_{b2}|=a_2$, where $a_2$ is its length.

The vector $R_{bc}$ which points from $R_c$ to $R_b$ is perpendicular to the vector $R_{21}$. The point of intersection of $R_{bc}$ with $R_{21}$ is denoted $R_p$. This definition of $R_p$ allows us to break the triangle with vertices at $R_1$, $R_2$, $R_b$ into one right triangle with vertices at $R_1$, $R_p$, $R_b$ and another right triangle with vertices at $R_2$, $R_p$, $R_b$. The lengths of the sides of right triangles are related by the Pythagorean theorem: $x^2+y^2=r^2$, where x and y represent the lengths of the two perpendicular sides, and r represents the length of the third side. We now use this theorem to determine the position of $R_p$ relative to $R_1$ and $R_2$.

$a_1^2 = R_{b1}^2 = R_{bp}^2 + R_{p1}^2.$ $a_2^2 = R_{b2}^2 = R_{bp}^2 + R_{p2}^2.$

The difference of these two equations is $a_1^2 - a_2^2 = R_{p1}^2 - R_{p2}^2.$

We note that $R_{p2}=R_{p1}-R_{21}$; therefore, $R_{p2}^2 = R_{p1}^2 - 2R_{21}·R_{p1} + R_{21}^2.$ Combining these two equations gives:

$a_1^2 - a_2^2 = 2R_{21}·R_{p1} - R_{21}^2.$ or equivalently, $R_{21}·R_{p1} = (R_{21}^2 + a_1^2 - a_2^2)/2.$ This means $R_{21}·R_{p1}$ can be either positive or negative, depending on the sign of $R_{21}^2 + a_1^2 - a_2^2$. For example, if $R_1$ were inside the sphere denoted $|R_{02}|=a_2$ and $a_1$ were much less than $a_2$, then $R_{21}·R_{p1}<0$. Whether $R_{21}·R_{p1}$ is positive or negative, $R_{21}×R_{p1}=0$, meaning that the two vectors are always either parallel or anti-parallel. In both cases, the vector extending from $R_1$ to the center of the circle of intersection is defined by the following equation:

$$R_{pl} = R_{21}(R_{21}^2 + a_1^2 - a_2^2)/(2R_{21}^2).$$

This equation defining $R_{p1}$ differs from those which preceded it. The earlier equations were general mathematical relationships and partial clues pointing toward a solution, but because this equation contains only known (measured or previously computed) quantities on the right hand side and a single variable on the left, it represents not just a mathematical relationship between a set of known and unknown quantities, but rather, an explicit procedure (neither implicit, recursive, nor iterative) for calculating the left hand unknown in terms of a set of known quantities. Explicit procedural equations such as this will be enclosed in boxes to distinguish them from other equations, which only describe how they are derived. The set of all these explicit, procedural equations evaluated in the specified order, constitute the procedure which determines the satellite position $R_0$. Now that we know $R_{p1}$, we may compute $R_{bp}{}^2$ from the earlier equation for $a_1{}^2$:

$$R_{bp}{}^2 = a_1{}^2 - R_{p1}{}^2.$$

As mentioned above, $R_b$ is only one possible solution for $R_0$, but we have not yet included the $a_3$ data in our calculation. Without that additional information, we could not distinguish between $R_b$ and any other point on the circle of intersection lying above or below the plane of FIG. 3. $R_{bp}{}^2$ is the square of the radius of the circle of intersection, which is also equal to $R_{0p}{}^2$.

$$R_{0p}^2 = a_1^2 - R_{p1}^2.$$

At this step of the calculation, we know three key things about the circle of intersection: first, the position of its center, $R_p = R_{p1} + R_1$; second, its radius, $|R_{0p}|$; and third, its orientation in three dimensional space, $R_{21} \cdot R_{0p} = 0$. We still must determine. the angular position of $R_0$ on the circle of intersection in order to obtain the full vector solution: $R_0 = R_{0p} + R_p$. Determining that angle requires a third measurement.

Constructing the Coordinate System

In order to define the angular position of $R_0$, we define a set of coordinate axes relative to which the angle is measured. We denote the line connecting $R_1$ and $R_2$ as the x-axis, and define the x-directed unit vector as $$U_x = R_{21} / |R_{21}|.$$

(Dividing any vector by its own length produces a unit vector, that is, a vector with length equal to one.) This x unit vector ($U_x$) is the "unit normal vector" of the circle of intersection, meaning that it is perpendicular to the plane containing that circle.

The cross product of two parallel (or antiparallel) vectors is zero. If $R_3$ does not lie on the x-axis, then $R_{31}$ is not parallel (or anti:-parallel) to $R_{21}$ and $U_x$. In that case, $R_{z1} = U_x \times R_{31}$ is non-zero and is normal to the plane containing the RNs. If $R_3$ lies on or very near to the x-axis, then $|R_{z1}|$ is zero or very close to zero, and the position computation becomes inaccurate. This is true regardless of the computational algorithm used, but this algorithm detects this condition explicitly, so that appropriate action may be taken, and the results of the computation will not be misinterpreted.

It is sometimes convenient to express $R_{z1}$ in reference to $R_p$ rather than $R_1$. This can be done because $$R_{31} = R_{3p} + R_{p1}$$

$$R_{z1} = U_x \times R_{3p} + U_x \times R_{p1}$$

$U_x$ is parallel to $R_{21}$ and $R_{p1}$; therefore, $U_x \times R_{p1} = 0$. We define the remaining two orthonormal vectors ($U_y$ and $U_z$) of this coordinate system as follows:

$$R_{z1} = U_x \times R_{3p}$$

$$U_z = R_{z1} / |R_{z1}|.$$

$$U_y = U_z \times U_x.$$

There is no need to divide $U_y$ by its own length, as we did for $U_x$ and $U_z$, because $U_x$ and $U_z$ are perpendicular, and both are of length one; therefore, their cross product will be of length one.

Intersection with Sphere 3

Figure 4:
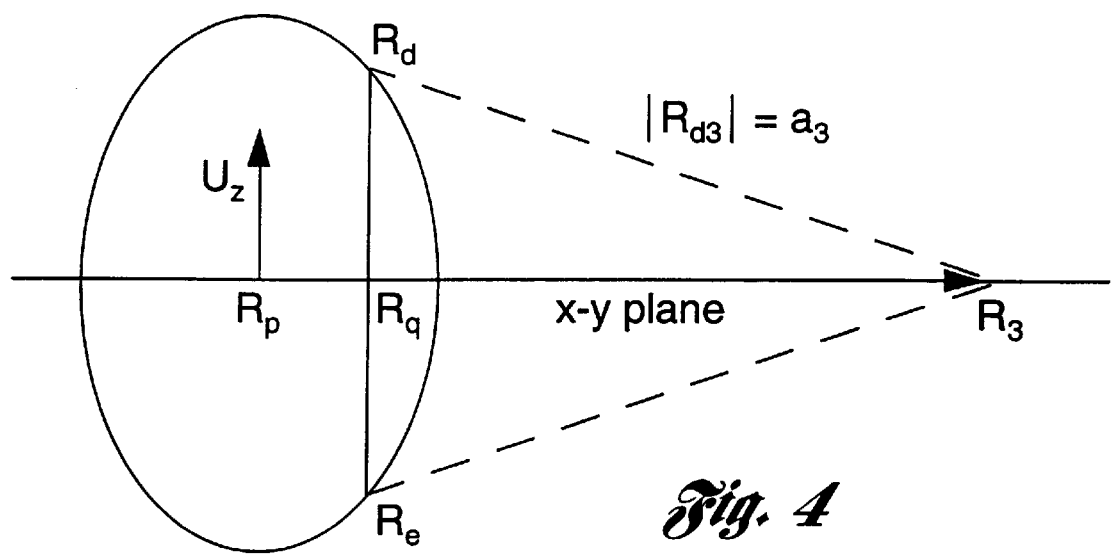
FIG. 4 is a diagram illustrating a circle of intersection extending above and below the X-Y plane of FIG. 2.

The measurement $a_3$ defines another sphere upon which $R_0$ must lie. If point 3 is not on the x-axis, then this sphere will cross the previously defined circle of intersection in two points, one above and one below the x-y plane, as shown in FIG. 4. We denote these crossing points $R_d$ and $R_e$, and note that $R_{de}$ is parallel to $U_z$. Denote as $R_q$ the point of intersection between $R_{de}$ and the x-y plane (which is the plane containing $U_x$ and $U_y$, and also the plane depicted in FIGS. 2 and 3)

We now develop a procedure for locating $R_d$ and $R_e$. The satellite position $R_0$ is equal to either $R_d$ or $R_e$. Since one of these will lie below the surface of the Earth, there is no difficulty in choosing the proper one as the last step of the computation.

Figure 5:
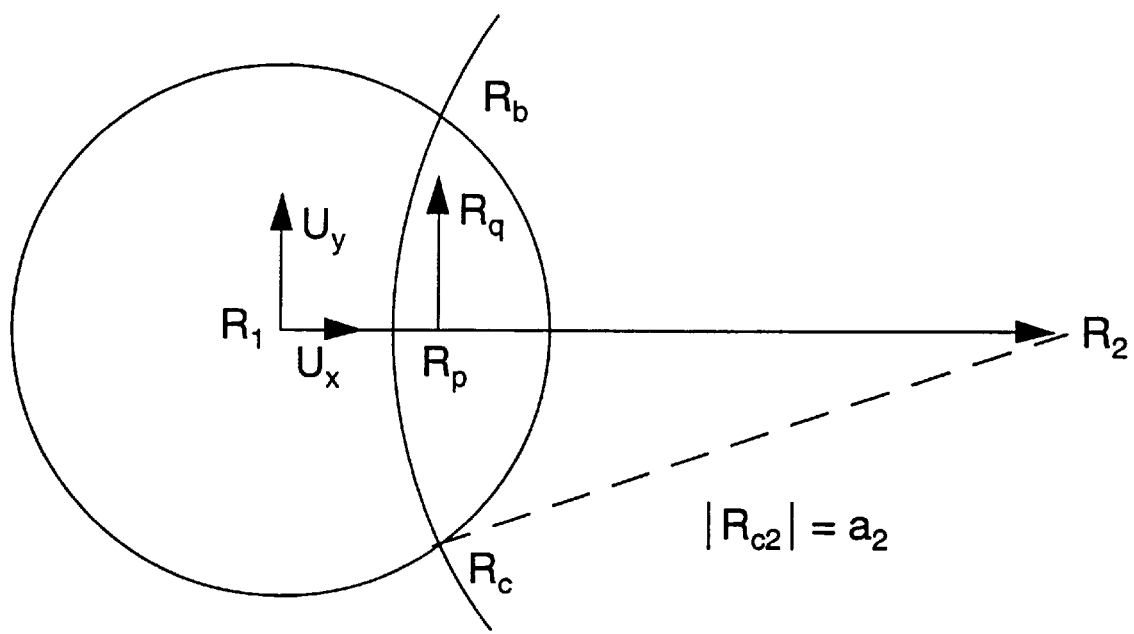
FIG. 5 is a diagram similar to FIG. 3, but adding x and y unit vectors, and a point denoted $R_q$ associated with a later step in the position determination.

As shown in FIG. 4, the vector $R_{dq}$ is parallel to $U_z$. FIG. 5, which is similar to FIG. 3, but with point $R_q$ added, shows that $R_{p1}$ is parallel to $U_x$, and $R_{qp}$ is parallel to $U_y$. The sum of these three vectors $R_{d1} = R_{dq} + R_{qp} + R_{p1}$ defines the position of point $R_d$ relative to point $R_1$, and likewise for $R_e$.

The Pythagorean theorem for the right triangle dpq decomposes $R_{dp}$ into two components which are aligned so that $R_{dq}$ is parallel to $U_z$ (see FIG. 4), and $R_{qp}$ is parallel to $U_y$ (see FIG. 5).

$$R_{dp}{}^2 = R_{dq}{}^2 + R_{qp}{}^2.$$

The decomposition of $Rd_3$ is similar; however, there is an added wrinkle. $U_z$ is perpendicular to $R_{q3}$, as shown in FIG. 4; therefore, $R_{q3}$ has no z component; however, $R_{q3}$ may contain non-zero components in both the x and y directions. This is in contrast to $R_{qp}$ which has only a y component, as shown in the previous paragraph.

$$a_3{}^2 = R_{d3}{}^2 = R_{dq}{}^2 + R_{q3}{}^2.$$

The difference of these two equations is $$a_3{}^2 - R_{dp}{}^2 = R_{q3}{}^2 - R_{qp}{}^2.$$

We note that $R_{q3} = R_{qp} + R_{p3}$; therefore, $$R_{q3}{}^2 = R_{qp}{}^2 + R_{p3}{}^2 + 2R_{qp} \cdot R_{p3}.$$

Combining these last two equations yields:

$$a_3{}^2 - R_{dp}{}^2 = R_{p3}{}^2 + 2R_{qp} \cdot R_{p3}.$$

Note that $R_d$ is one of the possible solutions for $R_0$; therefore, $R_{dp}{}^2 = R_{0p}{}^2$. This is the radius of the circle of intersection, which we calculated previously. Substituting this into the previous equation yields:

$$R_{qp} \cdot R_{p3} = (a_3{}^2 - R_{0p}{}^2 - R_{p3}{}^2)/2.$$

As in a similar equation in the two sphere intersection procedure, this dot product, $R_{qp} \cdot R_{p3}$ can be either positive or negative. The same procedure applies to both:

$$R_{qp} = U_y(a_3^2 - R_{0p}^2 - R_{p3}^2)/(2U_y \cdot R_{p3}).$$

Note that $U_y \cdot R_{p3} = -U_y \cdot R_{31}$. This quantity appears in the denominator of the equation above; hence, if it is zero, the algorithm breaks down. This is not an artifact of this particular algebraic derivation, but a fundamental, geometrical constraint. If $U_y \cdot R_{31} = 0$ then point 3 lies on the x-axis. In that case we can determine only that $R_0$ lies on a circle whose unit normal vector is $U_x$. We can determine the radius of that circle, $|R_{0p}|$, and the position of its center, $R_p$, but not the angular position of $R_0$ around that circle.

The third RN must lie far enough from the x-axis to break the cylindrical symmetry, and resolve the angular position of $R_d$ and $R_e$, one of which is equal to $R_0$. The accuracy of the position computation degrades as the third RN approaches the x-axis. We have applied this analysis to actual orbital configurations of proposed systems in order to assess the accuracy of the algorithm in the face of measurement errors and sub-optimal RN alignments. In almost all cases, $U_y \cdot R_{31}$ is large enough, and the algorithm can continue as follows: The position of point q relative to the center of the Earth is $$R_q = R_{qp} + R_{p1} + R_1.$$

Knowing $R_{qp}$, we can use the Pythagorean theorem for triangle dpq (see FIG. 4) to obtain $R_{dp}^2 = R_{dq}^2 + R_{qp}^2$, which leads to the two candidate solutions for the satellite position:

$$|R_{dq}| = (R_{dp}^2 - R_{qp}^2)^{1/2};$$

$$R_d = R_q + U_z|R_{dq}|;$$

$$R_e = R_q - U_z|R_{dq}|.$$

Notice that the two solutions are located symmetrically above and below the plane containing the RNs. Because the RNs are all on the surface of the Earth, one of these solutions will lie either inside, or on the opposite side of the Earth. In virtually all cases, only one of the solutions, $R_d$ or $R_e$, will be within the field of view of all of the RNs which supplied the data; therefore, the algorithm can reject the spurious solution, and identify the other as $R_0$.

Intersection of Sphere and Concentric Cone

If only two RNs are in view of a satellite, and provided that the satellite is not stationary with respect to the Earth, then measurements of range and range rate from a single RN can localize the satellite's possible positions to a circle of intersection, just as does the two sphere intersection discussed above. In this case, the circle of intersection corresponds to the intersection of a sphere with a cone whose vertex is located at the center of the sphere. After this circle of intersection is defined by a new procedure, one can apply the same sphere circle intersection procedure as is used with the Three Sphere positioning algorithm to solve for the satellite's position.

In the Sphere and Concentric Cone algorithm, the range measurement again constrains possible solution points to the surface of a sphere. The new facet is that the range rate measurement further limits solution points to a cone whose vertex lies at the center of that same sphere. Because the cone is concentric with the sphere, their curve of intersection is a circle. Such a circle is analogous to a line of constant latitude on a globe of the Earth; however, its orientation is defined by the motion of the satellite, and not fixed to the Earth.

If the satellite were in uniform, linear motion relative to the RN, then the relative velocity vector ($V_{01}$) divided by its own length would define the axis of the cone (which is $U_x$), and the ratio of radial to total relative velocity would determine the cone's angle=arccos ($v_r/|V_{01}|$); however, the actual situation is a bit more complicated. The satellite of interest in the present invention, and also the RNs on the surface of the Earth are in nearly uniform, circular motion relative to inertial space.

Despite the added complexity in this case, we still obtain a closed form solution. The generalization to elliptical satellite orbits is a trivial extension of this algorithm, and while not discussed in detail, should be considered included in the present invention. Both the satellite and the RNs are moving along trajectories of constant altitude. In the case of the RNs, this is due to the rotation of the surface of the Earth. One can express the velocity in any circular motion as $V_j = W_j \times R_j$; therefore, $$V_{01} = W_0 \times R_0 \times W_1 \times R_1,$$

where $W_j$ is the vector angular velocity. For RNs fixed to the surface of the Earth, $W_1$ is identical to the Earth's angular velocity. If the satellite is not geostationary, but is moving in an orbit which is approximately circular, then on the time scale of the calculation process, we consider $W_0$ to be constant.

As described above, the system measures the distance between the primary RN and the satellite ($a_1$) from the signal propagation time, and the radial velocity ($v_r$) from the time history of range measurements and from the Doppler shift. These scalar measurements are related to the satellite's vector position and velocity as follows:

$$V_{01} \cdot R_{01} = v_r a_1,$$

The range and range rate measurements define $V_{01} \cdot R_{01}$; however, since $R_0$ is unknown, and is involved in the definitions of both $R_{01}$ and $V_{01}$, we must do some vector algebra to disentangle $R_0$ from the cross product.

$$V_{01} \cdot R_{01} = (W_0 \times R_0 - (W_0 - W_{01}) \times R_1) \cdot R_{01} = (W_0 \times R_{01} + W_{01} \times R_1) \cdot R_{01}.$$

Note that $W_{0 \times R01}$ is perpendicular to $R_{01}$, while $W_{01} \times R_1$ has components both perpendicular and parallel to $R_{01}$. The dot product $(W_0 \times R_{01}) \cdot R_{01}$ is zero; therefore, $$V_{01} \cdot R_{01} = (W_{01} \times R_1) \cdot R_{01}.$$

We assume that the satellite's angular velocity ($W_0$) is known to high accuracy, and that what is not known at the time of the measurement is its precise position ($R_0$). The angular velocity of the Earth ($W_1$) and the position of the primary RN ($R_1$) are assumed to be known. This implies that the vector $W_{01} \times R_1$ is known, and we use it to define the x unit vector ($U_x$) in this Range and Range Rate algorithm. It plays the same role here that $R_{21}$ does in the Three Sphere algorithm.

$$U_x = W_{01} \times R_1 / |W_{01} \times R_1|.$$

The center of the circle of intersection is again denoted $R_p$, and in this algorithm, $$R_{p1} = U_x(R_{01} \cdot U_x) = U_x a_1 v_r / |W_{01} \times R_1|.$$

As in the Three Sphere algorithm, $$R_{0p}^2 = a_1^2 - R_{pl}^2.$$

Via these equations, i.e., range plus range rate measurements from a single RN, the position, orientation, and radius of the circle of intersection are provided without using a second RN. Once one has the circle of intersection, either from Two Sphere or Sphere and Concentric Cone method, then one can use the same method to intersect that circle with the final sphere to get the satellite's position. In the Range and Range Rate method, all references to the "third RN" in the final sphere intersection method actually refer to the second RN, since no third RN is required. After the assignments $R_3 = R_2$ and $a_3 = a_2$, the Range and Range Rate algorithm proceeds in the same way as the Three Sphere algorithm.

While the best modes for carrying out the invention have been described in detail, those familiar with the art to which this invention relates will recognize various alternative designs and embodiments for practicing the invention as defined by the following claims.

What is claimed is:

1. A system for determining a position of an orbiting transceiver in a communications network, the system comprising:
    a primary transceiver at a primary ranging node at a known location;
    at least first and second secondary transceivers at secondary ranging nodes at a first and second known location,
    wherein said primary and secondary transceivers are operative to transmit and receive communications signals to and from the orbiting transceiver and operative to communicate with each other by relaying messages through the orbiting transceiver, and
    wherein said primary transceiver is operative to receive ranging codes broadcast by the orbiting transceiver after receipt from said primary transceiver and reply codes originating at said secondary transceivers and relayed through said orbiting transceiver, and
    wherein said reply codes uniquely identify the secondary transceiver that is replying and the particular ranging code broadcast by the orbiting transceiver to which the secondary transceiver is replying, and
    a processor located at said primary ranging node and operative to distinguish between the received ranging codes and reply codes, identify the position of the secondary transceiver that is replying, compute the time difference between the arrival time of the reply code and the time of transmission of the ranging code from the primary transceiver that elicited the reply, and operative to determine a first and second range measurement between each of the primary transceiver and the secondary transceiver that is replying and the orbiting transceiver, respectively, determine a first and second range rate corresponding to a time rate of change of the first and second range measurements, respectively, determine a circle of intersection representative of the set of possible positions for the orbiting transceiver based on the first range measurement and the first range rate, wherein the circle of intersection includes a specific orientation in space, a specific radius, and a center in a specific, three dimensional position relative to the known position of the primary transceiver, determine an angular position of the orbiting transceiver along the circle of intersection based on the known position of the at least one secondary ranging transceiver and the second range measurement, and determine the position of the orbiting transceiver based on the circle of intersection and the angular position, wherein the processor, in determining the first and second range measurements, is further operative to determine the first and second range measurements utilizing two-way ranging.

2. The system as recited in claim 1 wherein the orbiting transceiver is not stationary with respect to Earth.

3. The system as recited in claim 1 wherein the orbiting transceiver is stationary with respect to Earth.

4. The system as in claim 1 wherein the secondary ranging node is a stationary automobile.

5. The system as in claim 1 wherein the secondary ranging node is a stationary telephone.

6. The system as in claim 1 wherein the secondary ranging node is a stationary aircraft.

7. The system as in claim 1 including a single clock at the primary ranging node.

8. A method for determining a position of an orbiting transceiver in a communications network including at least a primary transceiver at a primary ranging node at a known location and at least one secondary transceiver at a secondary ranging node at a known location, the primary and secondary transceivers adapted to transmit and receive communication signals to and from the orbiting transceiver, the method comprising:
    transmitting ranging codes from said primary transceiver to said orbiting transceiver;
    broadcasting the ranging codes from the orbiting transceiver after receipt from said primary transceiver to said at least one secondary transceiver;
    relaying reply codes originating at said at least one secondary transceiver through said orbiting transceiver to said primary transceiver, wherein said reply code uniquely identifies the secondary transceiver that is replying and the particular ranging code broadcast by the orbiting transceiver to which the secondary transceiver is replying, and
    determining a first and second range measurement between each of the primary transceiver and said at least one secondary transceiver and the orbiting transceiver, respectively;
    determining a first and second range rate corresponding to a time rate of change of the first and second range measurements, respectively;
    determining a circle of intersection representative of the set of possible positions for the orbiting transceiver based on the first range measurement and the first range rate, the circle of intersection having a specific orientation in space, a specific radius and a center in a specific, three dimensional position relative to the known position of the primary transceiver;
    determining an angular position of the orbiting transceiver along the circle of intersection based on the known position of said at least one secondary transceiver and the second range measurement; and
    determining the position of the orbiting transceiver based on the circle of intersection and the angular position,
    wherein the first and second range measurements are determined utilizing two-way ranging.

* * * * *